US006438262B1

(12) United States Patent
Bernardini et al.

(10) Patent No.: US 6,438,262 B1
(45) Date of Patent: Aug. 20, 2002

(54) SECURITY DOCUMENT VALIDATION

(75) Inventors: Ronald Bernardini, Downingtown; John Gorczyca, Lansdale, both of PA (US); Phil Skipper, Wallhwil (CH)

(73) Assignee: Mars Incorporated, McLean, VA (US)

( * ) Notice: Subject to any disclaimer, the term of this patent is extended or adjusted under 35 U.S.C. 154(b) by 0 days.

(21) Appl. No.: 09/117,668

(22) PCT Filed: Feb. 5, 1997

(86) PCT No.: PCT/GB97/00321

§ 371 (c)(1), (2), (4) Date: Apr. 14, 1999

(87) PCT Pub. No.: WO97/29459

PCT Pub. Date: Aug. 14, 1997

(30) Foreign Application Priority Data

Feb. 5, 1996 (GB) ............................................. 9602260

(51) Int. Cl.$^{7}$ ................................................ G06K 9/00

(52) U.S. Cl. ...................................................... 382/135

(58) Field of Search ................................ 382/135, 137, 382/141, 270, 272, 273, 274, 312, 313, 318; 902/7, 37; 209/534; 235/435, 439, 440, 441, 468, 472.01; 348/162, 164, 94, 192; 194/207

(56) References Cited

U.S. PATENT DOCUMENTS

| | | | |
|---|---|---|---|
| 3,782,543 A | 1/1974 | Martelli et al. | 209/555 |
| 4,068,385 A | 1/1978 | Mitzel | 33/501.03 |
| 4,186,943 A | 2/1980 | Lee | 283/91 |
| 4,524,276 A | 6/1985 | Ohtombe | 250/338.1 |
| 4,558,224 A | 12/1985 | Gober | 250/461.1 |
| 4,650,320 A | 3/1987 | Chapman et al. | 356/71 |
| 5,388,862 A | 2/1995 | Edwards | 283/82 |
| 5,483,363 A * | 1/1996 | Holmes et al. | 359/2 |
| 5,639,126 A * | 6/1997 | Dames et al. | 283/83 |

FOREIGN PATENT DOCUMENTS

| | | | |
|---|---|---|---|
| EP | 0059056 | 9/1982 | D21F/11/00 |
| EP | 0021093 B1 | 5/1983 | G02B/19/00 |
| EP | 0229645 A1 | 7/1987 | D21H/5/10 |
| EP | 0 253 935 A2 | 1/1988 | G06K/7/10 |
| EP | 0319157 A2 | 6/1989 | D21H/5/10 |
| EP | 0400902 A2 | 12/1990 | D21H/21/42 |
| EP | 0518740 | 12/1992 | D21H/21/42 |
| EP | 0690421 A1 | 1/1996 | G07D/7/00 |
| GB | 1552853 | 9/1977 | G02B/5/28 |
| GB | 1604463 | 12/1981 | B42D/15/00 |
| GB | 2107911 A | 5/1983 | G07D/7/00 |
| GB | 2159268 A | 11/1985 | G01N/21/59 |
| GB | 2221030 A | 1/1990 | G07D/7/00 |
| WO | WO 94/16412 | 7/1994 | G07D/7/00 |

* cited by examiner

*Primary Examiner*—Andrew W. Johns
*Assistant Examiner*—Shervin Nakhjavan
(74) *Attorney, Agent, or Firm*—Fish & Richardson P.C.

(57) ABSTRACT

Method and apparatus for validating banknotes. In some countries, genuine banknotes are provided with a security thread embedded in the banknote, but partially exposes at regularly spaced regions along its length by windows. The windows have a width greater that the security strip itself. The increased transmissivity of the banknote in the infrared region is utilized to detect the presence of such windows to validate the banknote. If the required variation in transmissivity is not detected, the banknote can be rejected as a countefeit.

27 Claims, 5 Drawing Sheets

SECURITY DOCUMENT VALIDATION

BACKGROUND

This invention concerns validators for, and methods for validating, security documents, in particular security documents comprising an embedded security device which is at least partially exposed by one or more exposure windows. The security documents to be validated may be banknotes, cheques or similar documents of monetary value.

Banknote validators, or counterfeit detectors, of various forms are already known. Automatic banknote validators are used in machines which accent banknotes as a form of payment such as vending machines. Automatic validators use relatively sophisticated validation techniques, such as high resolution scanning of a banknote in visible light to produce a scanned image which is compared with that expected of a valid banknote.

Another type of banknote validator is that used to augment the ability of a human operator to detect counterfeits. One such device which is relatively simple and inexpensive is known from International Patent Application No. WO94/16412. The device measures the ultraviolet fluorescence and reflectance characteristics of a banknote. Excessive levels of fluorescence can be detected in a counterfeit banknote, upon which the validator signals to the operator visibly and/or audibly to alert the operator to the invalidity of the banknote.

Although such validators to be used by human operators are now in general usage, it would be desirable to provide a further test whereby counterfeit banknotes can be detected.

Banknotes contain various security devices which are designed to be reproduced only with extreme difficulty, and to offer an immediate means of recognizion of a valid banknote to the human eye. One such device is the security strip or thread which is incorporated into banknotes in a number of countries. The security thread, usually consisting of a metallised plastics strip, is embedded in a banknote in such a manner that the thread is at least partially exposed by a number of windows which are located at spaced locations in the paper substrate. As a result, when the banknote is seen in reflected light, the security strip is visible at a number of locations corresponding to the positions of the windows in the paper, and in transmitted light the whole length of the security thread is visible. Thus, although the surface printing on a banknote may be copied readily by modern colour photocopying techniques, the security thread provides a further defense against counterfeiters.

It is known to provide validators which detect the presence, or absence, of a security thread in a banknote. Unfortunately, counterfeiters can reproduce a security thread by various ingenious methods.

Banknotes which are provided with security threads may be produced in a number of different ways. EP-A-0 059 056 describes a method in which a cylinder mould is used. A web of security thread is wound around the cylinder and supported by raised portions on the cylinder such that when paper fibres are deposited on the mould to produce paper webs, windows are produced corresponding to the raised portions of the mould. Windows might also be provided by embedding a security thread between two separately formed sheets of paper which are wet laminated or dry laminated together (see for example EP-A-0-229 645). One or both of these sheets may be provided with apertures, or relatively thin regions, through which the security thread is exposed in the paper product.

It is to be noted that in a number of countries the windows, however formed, are of greater length than necessary merely to expose the security thread across its width. This is due to the fact that the location of the security strip in the banknote paper is gradually varied so as to meander across the windows. As a result, when the banknotes produced are stacked into bundles, the positions of the security thread in the bundled banknotes are not all aligned, and extreme thickness of the bundles corresponding to the location of the security threads is avoided.

SUMMARY

In one aspect, the present invention provides a method of validating a document comprising an embedded security device which is partially exposed by one or more exposure windows, the method comprising the steps or inspecting the document in one or more regions adjacent said security device, and judging on the presence of said one or more exposure windows on the basis of said inspecting step to provide a validation signal.

The windows associated with the security thread of a banknote are a feature which is difficult to reproduce and therefore suitable to provide for the relatively simple but effective validation of banknotes and detection of counterfeits.

It is possible to judge on the presence of the one or more windows by mechanically detecting thickness variations across the document. However, such direct thickness sensing would require sensitive, and therefore relatively costly, equipment. Mechanical thickness sensing would also be difficult to employ for hand-held use. The inspecting step preferably comprises generating radiation, locating the document such that said radiation impinges on the document, and sensing radiation transmitted through the document in one or more regions adjacent said security device.

The sensed radiation preferably comprises infrared radiation. Although the windows may be sensed using other forms of radiation, such as visible light, the windows are highly visible in the infra-red region of the electromagnetic spectrum. The surface printed inks on a security document such as a banknote are generally transparent to infra-red radiation, whereas thickness or density variations cause readily detectable differences in the amount of radiation transmitted.

The presence of an exposure window in a document could theoretically be determined by sensing the intensity of radiation transmitted through a single region of the document, i.e. the window itself. However, a counterfeit could readily pass such a test and to improve reliability and effectiveness it is preferred that radiation transmitted through a first region of the document is sensed to produce a first output and radiation transmitted through a second region of the document is sensed to produce a second output, which outputs are analysed to judge on the presence of said one or more exposure windows. The validation signal may be provided when said first output indicates that the sensed radiation has passed through an exposure window and said second output indicates that the sensed radiation has not passed through an exposure window.

The outputs may be analysed in a number of ways which may be used alone or in combination. For instance, the analysis may involve taking a difference between the sensed outputs, or may involve taking a ratio of the outputs. The difference or the ratio may be subjected to predetermined criteria in order to determine whether a validation signal should be provided.

The analysis may also involve comparing at least one of said outputs with a predetermined reference value or a predetermined range of values during said analysis. Preferably, this analysis involves determining whether one of said outouts corresponds with that expected on detection of a valid window, and determining whether the other of said outputs corresponds with the detection of a valid region between, or outside, said one or more windows In one method of the invention particularly, but not exclusively, pertaining to banknotes, the security device is a strip or thread, and said first and second regions through which the sensed radiation passes are spaced in a direction parallel to said security device.

In one embodiment, said first output is produced by a first sensor and said second output is produced by a second sensor.

In another embodiment, said inspecting step comprises moving a sensor relative to said document in a direction generally parallel to said security device, and said first and second outputs are produced sequentially during the movement. This reduces the number of sensors required in order to determine the presence or absence of the exposure windows in the security document.

The inspecting step may comprise inspecting said document along a line to produce a profile of the document along said line, said validation signal being provided in response to, or in the absence of, the detection of a desired variation in said profile indicating the presence of said one or more exposure windows. The profile is preferably that of the transmission characteristics of said document along said line or inspection. The detection preferably involves detecting one or more windowed regions, and detecting one or more non-windowed regions. Preferably, the profile is analysed to perform said judging, said analysis involving determining the geometric relationship of said detected windowed regions and said detected non-windowed regions along said line of inspection. Although the analysis may involve determining a periodic relationship between the two regions corresponding to the regular spacing of the windows, that may require an undue degree of processing. In a less complex method the analysis may involve taking a ratio of the length of one or more of the detected windowed regions along said line with the length of more or more of the detected non-windowed regions along said line.

Since the security device itself, such as in the case of the security thread of a banknote, may be substantially opaque, it may be that i the document were inspected in only one region, the security device itself would obscure the exposure windows in transmitted light. Accordingly, it is preferred that the inspecting step comprises inspecting the document simultaneously in at least two regions, said judging stem comprising judging on the presence of said one or more exposure windows in any of said at least two regions. When the security device is a thread, those at least two regions are preferably spaced in a direction transverse to the length of the thread.

The present invention also provides apparatus comprising means for performing the method of the invention. In one embodiment, such means may comprise one or more radiation emitting means and one or more radiation detecting means, at least one of said emitting means preferably being located on a first support means and at least one of said detecting means being opposedly located on a second support means, said first and second support means being separated by an opening into which a document is to be inserted by a human operator for inspection using the apparatus.

To reduce complexity and cost, the sensor pairs are preferably small in number (these may be less than ten) and arranged to inspect only a portion of the document. The apparatus may further comprise means for indicating to a human operator a desired disposition of the security device during inspection. This should ensure reliable sensing of the exposure windows, which are located in the area of the security device.

According to a further aspect of the invention, a validator for security documents is provided, said validator comprising sensor means for discriminating between valid and counterfeit security documents, switch means for activating said sensor means, and support means for said sensor means, wherein said support means comprise a first portion and a second portion separated by an opening for a document to be validated, said first portion being movable with respect to said second portion to actuate said switch means.

Said sensor means preferably comprises radiation emitting means located on said first portion of the support means, and radiation sensing means located on said second portion of the support means.

Said radiation sensing means may comprise an infra-red radiation sensor.

The validator preferably comprises a plurality of radiation sensors providing a plurality or outputs to a processing means for analysing said plurality of outputs to provide a validation signal.

Said processing means preferably analyses two or more of said outputs in combination to determine whether said validation signal should be given.

The validator is preferably adapted so that when said support means is in said second relative position, a said sensor means may be moved relative to a document to be validated located between said first and second portions of the support means.

In said second relative position, said first and second portions preferably remain separated by an opening allowing a document to be validated to be moved relative to said sensor means.

BRIEF DESCRIPTION OF THE DRAWINGS

Preferred embodiments of the invention will now be described, by way of example only, with reference to the accompanying set of drawings in which.

DETAILED DESCRIPTION

Figure 1:
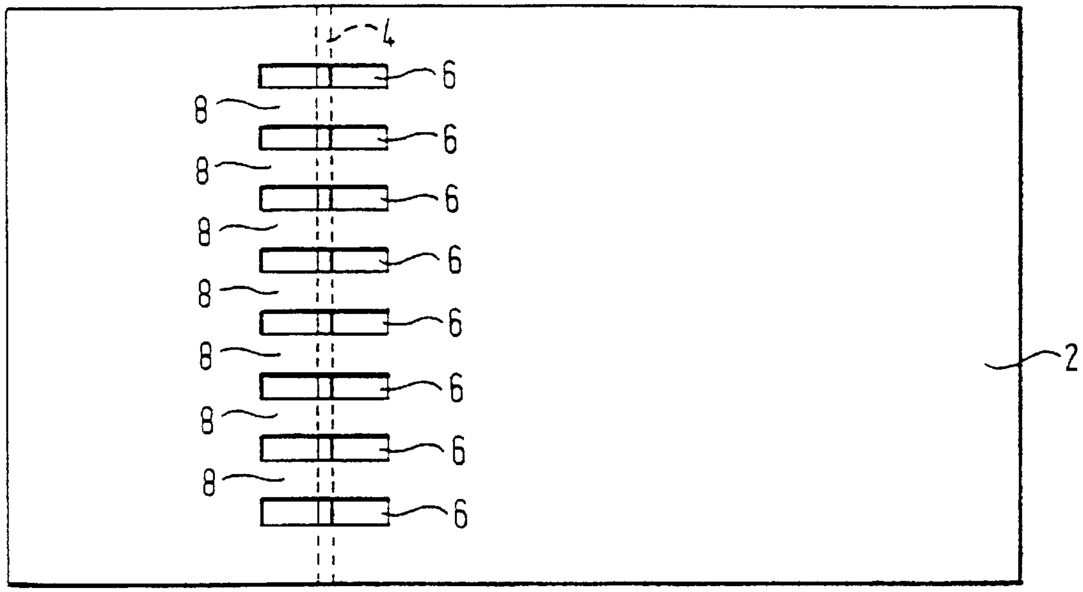
FIG. 1 is a plan view of a banknote to be validated.
Figure 2:
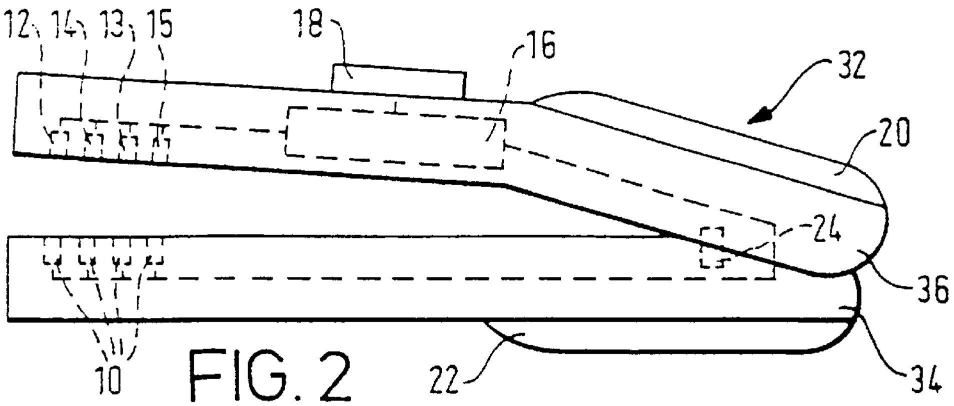
FIG. 2 is a side view of a banknote validator according to one embodiment of the invention.
Figure 3:
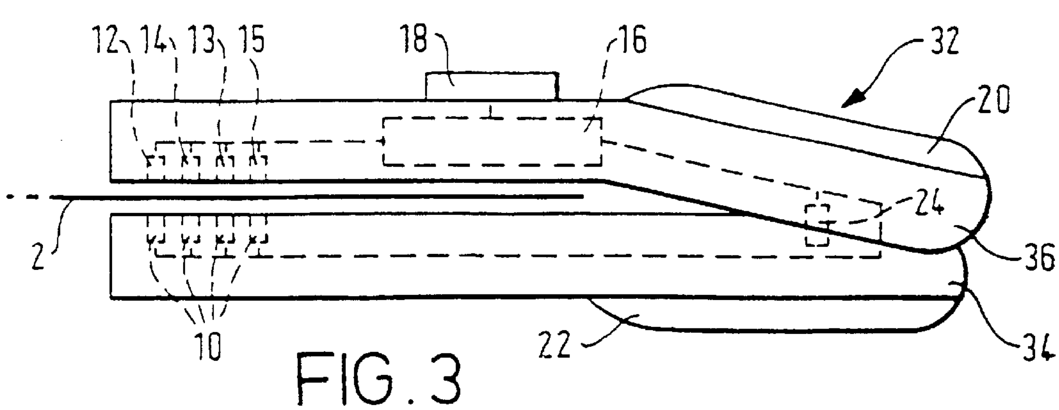
FIG. 3 is a side view of the validator of FIG. 3 during inspection of a banknote.
Figure 4:
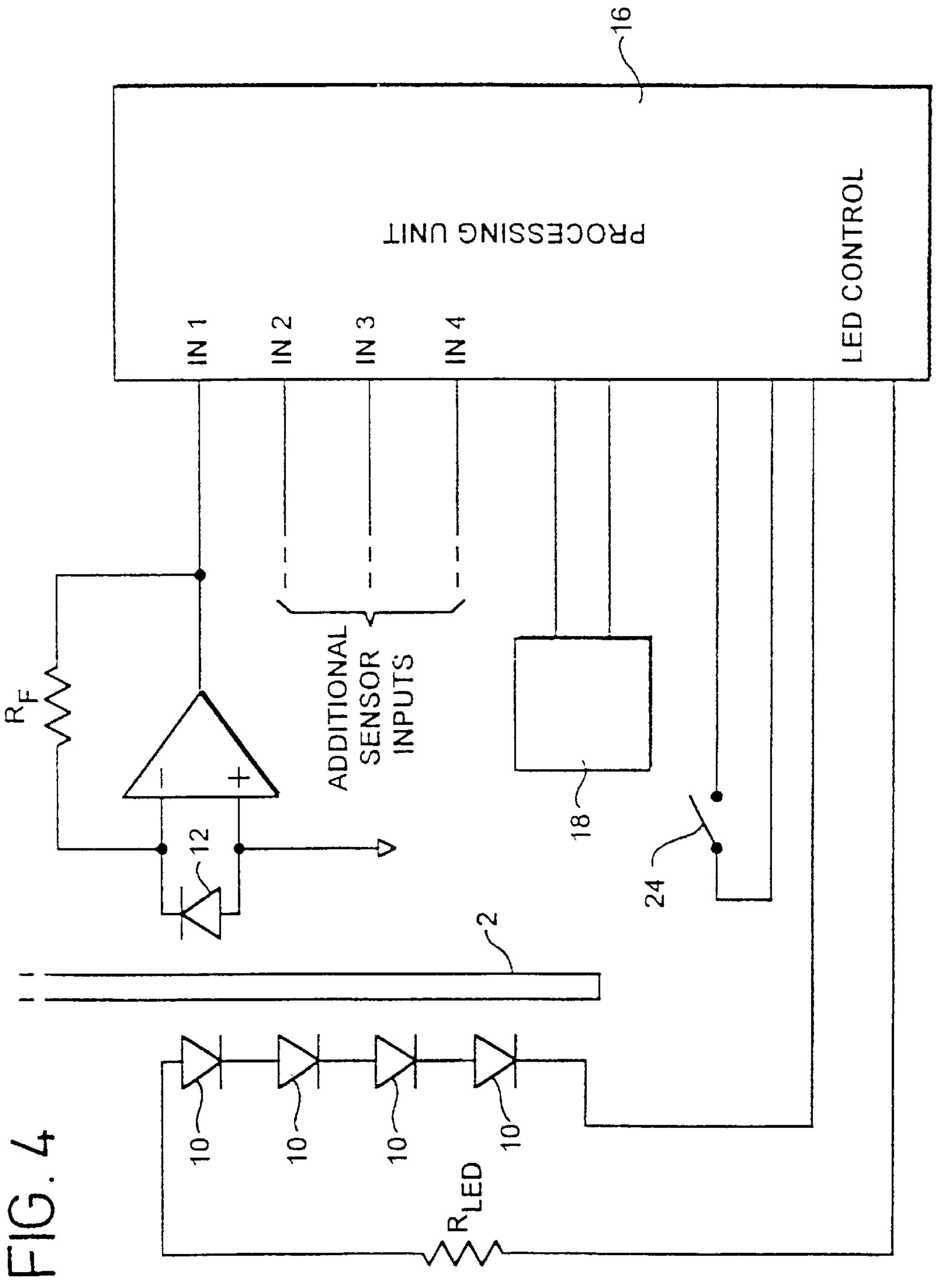
FIG. 4 is a schematic illustration of the electrical components of the validator of FIGS. 2 and 3.

A banknote similar to that currently in circulation in the United Kingdom is illustrated in FIG. 1. The banknote 2 comprises a partially embedded security thread 4 exposed at a plurality of locations across the banknote 2 by a plurality of regularly spaced windows 6. The windows 6 are not readily visible by the human eye in reflected light, but are sometimes discernable by the human eye in strong transmitted, light. The paper of the banknote is slightly thinner at the windows 6, and/or of lesser density in those windows 6. On the other hand, the regions of paper located immediately between the windows, herein referred to as "rungs" 8 are of equal or even slightly greater thickness and density as, or than, the remainder of the banknote 2. The width of the security thread 4 is approximately 1 nm whereas the length of the windows 6 is approximately 2 cm. Although the security thread 4 is shown located at the centre of the windows 6, it may be located at any point along their lengths.

Referring now to FIGS. 2–5, in one embodiment of the invention a hand-held banknote validator 32 has an elongate lower arm 34 and an elongate upper arm 36. The arms 34, 36 are hingedly connected at one end, and have four sensor pairs located adjacent their free ends. The sensor pairs consist of four infrared LEDs 10 located to project infra-red beams from the upper surface of the lower arm 36, and four infra-red photodiodes 12–15 located on the lower surface of upper arm 34 to receive the beams generated by the infra-red LEDs 10. The LEDs 10 and the photodiodes 12–15 are powered by one or more batteries, not shown in the diagrams. The outputs of the photodiodes 12–15 are amplified and fed to microprocessor 16 also located in the upper arm 36. Photodiodes 13–15 are not illustrated in FIG. 4, however they are connected to other inputs of the processing unit 16 in a manner similar to that of photodiode 12. The processing unit 16 has a built-in A/D converter for converting the input signals into the digital signals to be processed. The processing unit may be an 8-bit micrcoprocessor such as that made by Motorola under the serial number 68HC11E9. Microprocessor 16 has an output connected to an indicating unit 18, which has one or more indicators, such as visible flashing LEDs and/or an audible signal generator. Both the processing circuitry 16 and the alarm unit 18 are also powered by the unillustrated battery source. Of course, a remote source of power could be utilised, but such remote source is not necessary providing a sufficiently low amount of power is required by the validator 32.

The validator 2 is activated by squeezing the upper and lower arms 34,36 together. To this end, hand grips 20,22 are provided on the hinged end of the validator 32. The validator 32 is biassed to an open position, illustrated in FIG. 2, in which the lower arm 34 and upper arm 36 are held apart. The validator may be held by an operator in one hand at the end of the validator at which the grip portions 20 and 22 are located. Meanwhile, a banknote to be validated, held in the operator's other hand, may be inserted in the space between the validator arms 34,36. By applying manual pressure to the grip portions 20 and 22, the lower arm 34 and upper arm 36 may be moved together to the activated position shown in FIG. 3. A switch 24 located adjacent to the hinged end of the validator 32 is actuated upon closing of the validator arms 34,36. In the closed position, the free ends of the arms 34,36 remain spaced apear slightly to allow an inserted banknote lateral freedom of movement between the two arms 34,36. In the closed position, the LEDs 10 and photodiodes 12–15 of each sensor pair are in register.

The LEDs 10 may each be provided with a lens and/or a collimating slit, and the photodiodes 12–15 may be provided with similar optical means to ensure the sensing of a beam of a desired resolution. Since the windows to be detected may have a width for example of 4 millimetres, it is preferred that the beams sensed are correspondingly narrow to produce the desired resolution. In cases where the validator 32 is intended for use with banknotes having windows of different dimensions, the dimensions of the beams sensed should also correspond to give sufficient resolution. The LEDs 10 and/or chotodiodes 12–15 may also be provided with filters to ensure sensing at a predetermined wavelength or wavelengths.

Figure 5:
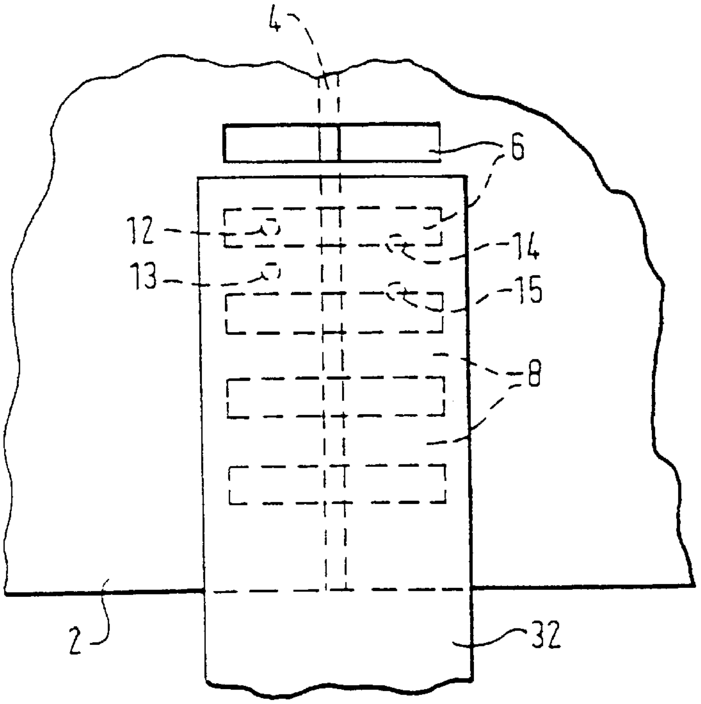
FIG. 5 is a simplified portional plan view of the arrangement of FIG. 3.

In order to validate a banknote, the banknote 2 is inserted between the validator arms 34,36 such that the security thread 4 lies parallel to, and between, the validator arms 34,36 as shown in FIG. 5. It should be noted that the sensor pairs 10,12–15 are spaced in a direction parallel to the length of the arms 34,36. The spacing is chosen so that when one photodiode 12 is located directly above a window 6 on the banknote 2, adjacent photodiodes 13 is located above a rung a between the windows 6 on the banknote. Furthermore, the other two pihotodiodes 14,15 have a similar relationship to one another and are arranged in an offset relation to photodiodes 12,13 so that when a window/rung combination is not clearly detectable by the two photodiodes 12,13, it is nevertheless ensured that a window/rung combination is detected by the two photodiodes 14,15 when the validator 32 is properly located over the security strip. The two photodiodes 14,15 are also spaced from the other photodiodes 12,13 in a direction transverse to the length of the arms 34,36 so that, should two of the photodiodes be obscured by the opaque security strip 4, the rungs and windows can still be sensed by the other two photodiodes. Of course, other arrangements of sensor pairs 10,12–15 than that shown could be utilised to similar effect.

When the validator is switched on, the LEDs 10 generate infra-red beams which are transmitted through the banknote to a greater or lesser degree according to the location of the windows 6 and rungs 8, and the photodiodes 12–15 sense the intensity of the transmitted radiation. The outputs of the photodiodes 12,13 are compared by the processing unit 16, by taking a ratio, to determine whether the ratio of intensities sensed corresponds to a predetermined value indicating the sensing of a window/rung combination. A similar operation could be performed by the use of comparators in addition to the processing unit 16. The processing unit 16 performs a similar analysis of the outputs of photodiodes 14,15. If the sensed output ratio falls within a predetermined range of values for either the two photodiodes 12,13 or the two photodiodes 14,15, a validation signal indicating the genuine nature of a banknote 2 is generated, and a "valid" indication is given by the indicator unit 18 in response to a validation signal sent by processing unit 16. However, if the banknote is a counterfeit, the windows 6 will not be present or will be likely to have an incorrect level of transmission compared to that of the rungs 8, and no "valid" indication will be generated by indicating unit 18. In addition or in the alternative, the indicating unit 18 may be caused to provide an alarm signal should the sensing not produce the desired variation in intensity of transmitted lit across the banknote. Such an alarm signal may be produced upon reopening of switch 24 when the validator is released and returned to its open position shown in FIG. 2.

The processing unit 16 may analyse the outputs from the photodiodes in ways other than simply taking the ratios of the outputs of photodiodes 12,13 or 14,15. For instance the circuitry 16 may analyse the outputs of the photodiodes to determine whether he absolute intensity of transmitted light sensed at one photodiode falls within a predetermined range of values corresponding to the presence of a window 6, and/or whether the absolute intensity of transmitted light sensed at a different photodiode corresponds with the presence of a rung 8. A difference between the outputs of two photodiodes could also be taken, to determine whether the difference falls within a range of predetermined values which indicate the detection of a window/rung combination.

It is of course not necessary to use four sensor pairs 10,12–15. Two sensor pairs could be employed to take ratios and/or differences. Indeed, one or more sensor pairs might be employed if absolute transmissivity is taken as an indication of the presence of a window 6.

It is also to be mentioned that the sensors having outputs to be taken in combination need not be aligned in a parallel fashion, since the transmissivity of the banknote 2 could also be sensed not only in the region of windows 6 but also in any other region of the banknotes 2.

It may be necessary for the operator to move the banknote 2 in relation to the validator 32 before registration of the windows 6, or rungs 3, with the detecting sensors is achieved. In fact, rather than attempting to correctly position the validator 2 directly over the security thread, an operator could instead swipe the validator relative to the banknote in a direction transverse to the security thread 4. Registration will then certainly be achieved during the course of the swipe.

Figure 6:
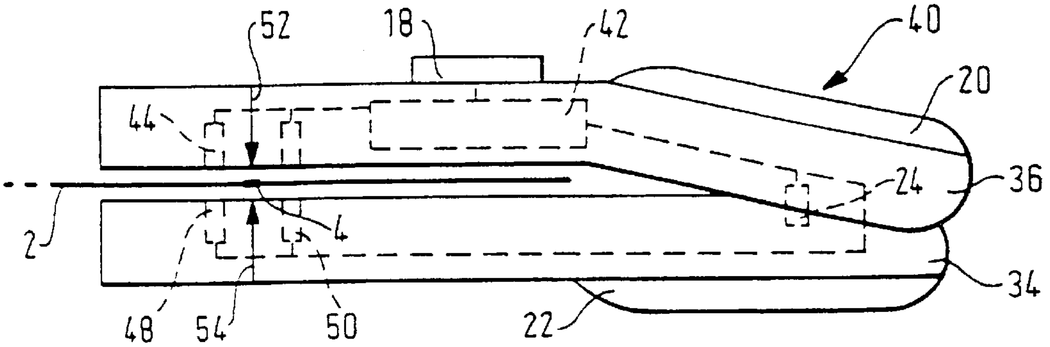
FIG. 6 is a side view of a banknote validator according to a different embodiment of the invention.
Figure 7:
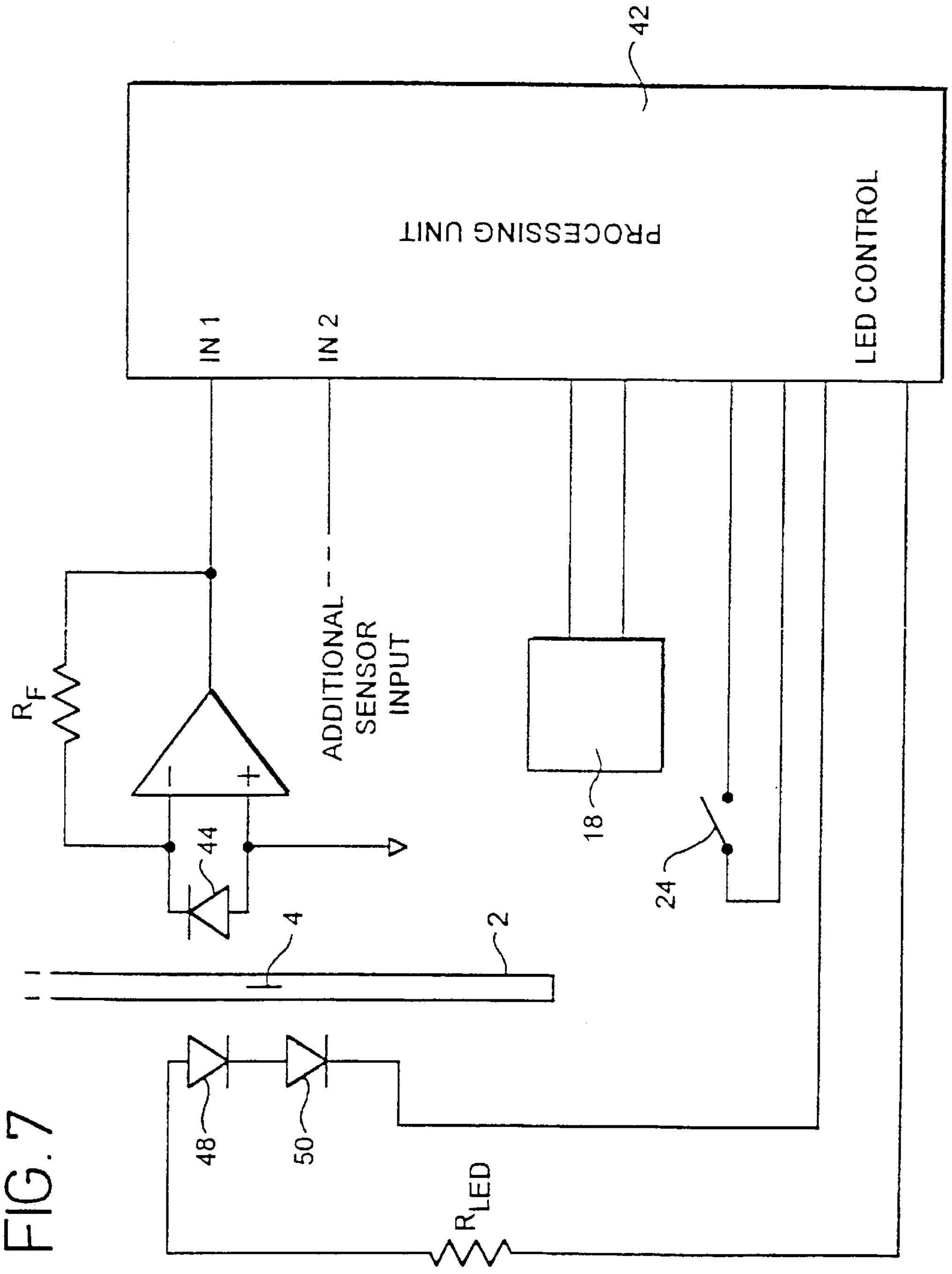
FIG. 7 is a schematic illustration of the electrical components of FIG. 6.
Figure 8:
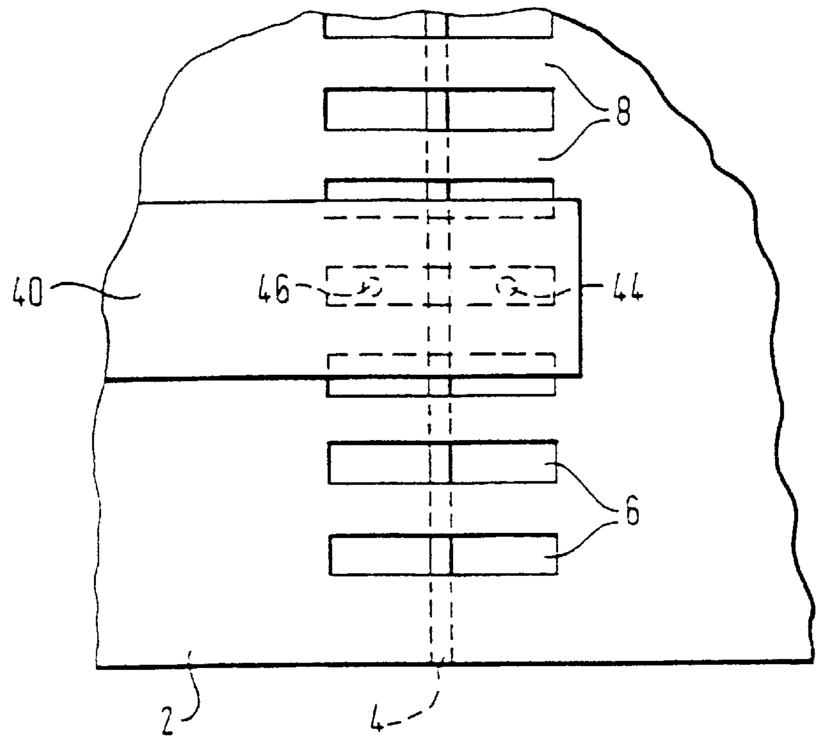
FIG. 8 is a simplified portional plan view of the arrangement of FIG. 6.

A further embodiment of the invention is illustrated in FIGS. 6–8, in which features similar to those shown in FIGS. 2–5 are appended with similar reference numerals In this embodiment, the validator 40 comprises a processing unit 42 (which may be similar to microprocessor 16 described in relation to the previous embodiment) which is responsive to the outputs of two infra-red photodiodes 44,46. The photodiodes 44,46 are spaced by an amount greater that the width of the security strip 4 of a banknote to be sensed, for reasons to be explained below. LEDs 48,50 generate beams to be sensed by photodiodes 44,46 respectively. The output of photodiode 40, although not illustrated in FIG. 7, is amplified and connected to a second input of processing unit 42 in a manner similar to that of photodiode 44. LEDs 48,50 and photodiodes 44,46 may be provided with lenses, collimators or filters as described in relation to the previous embodiment. The validator 40 is also normally biassed in an open position, and may be activated by the application or manual pressure to close the arms 34,36. The validator 40 is illustrated in its activated position in FIG. 6.

Figure 9:
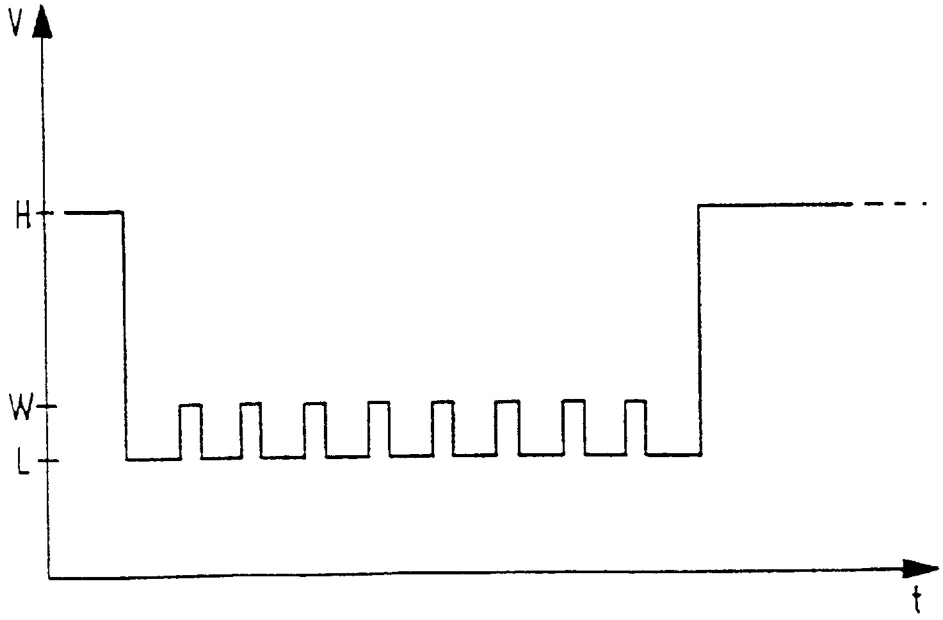
FIG. 9 is a graph illustrating a transmission profile of a banknote generated using the validator of FIG. 4.

In use, a banknote 2 is inserted between the upper and lower arms 36,34 of the validator 40 as shown in FIG. 8. The banknote is inserted such that the security thread 4 registers at least approximately with arrows 50,52 indicating the general location of the sensor pairs 44,48 and 46,50. The activated validator 40 is then swiped relative to the banknote 2 in a direction generally parallel to the security thread 4. The profile of an output generated by photodiode 44 when a valid banknote is swiped through the validator 40, or the validator is swiped across the banknote, is as illustrated in FIG. 9. The output (V) is plotted against time (t). Before any part of the banknote rasses between the sensor pair 44,48 the output is at a high level H. Once the banknote first passes between the sensors, the intensity of transmitted light falls to a low level L. When a windowed region 6 passes between the sensor pair 44,48 the transmissivity of the material increases due to the reduced thickness and/or density of the paper 5 is in the windowed region 6. The output of photodiode 44 then increases to an intermediate level W slightly above the low level L. After passing the first windowed corion 6, the output falls again to the low level L corresponding to the rung region 3, and thereafter the output varies periodically in a regular fashion between the intermediate level W and the low level L as more windows 6 and rungs 8 pass below the photodiode 44.

The sensor pair 46,50 which is displaced from the sensor pair 44,48 in a direction perpendicular to the security thread 4 of a correctly inserted banknote (as shown in FIG. 8) also generally produces the output profile illustrated in FIG. 9. Therefore, the output of only one of the sensor pairs could generally be used as an indicator of the presence of the exposure windows 6. However, the second sensor pair is provided so that the radiation beam of one sensor pair is blocked by the security thread 4 itself, or the security strip is at one extreme of the windows 6, the output of the remaining sensor pair can be relied upon to indicate on the presence of windows 6 in a valid banknote 2.

The processing unit 42 could process the output of one or both sensor pairs in a number of different ways. For instance, the circuitry 42 may determine whether the output during activation of the validator 40 reaches a value within a range of allowed values centred on the low level L, and whether the output reaches one of a range or allowed values centred on the intermediate value W. A validation signal could be provided if both those conditions are met. To provide increased certainty, the number of times at which the output enters each, or one of, those ranges of values may be counted as the banknote is swiped through the validator. When a predetermined count is reached, a validation signal would be generated.

The high output signal H may be utiilised in order to calibrate the output of the photodiodes 44,46 which may vary due to various factors such as battery output power and LED efficiency.

The profile illustrated in FIG. 9 corresponds to a swipe of relatively constant velocity. With such swipes, the total time over which the output remains at the low level L can be compared to the time over which the output remains at the intermediate level W to measure an aspect ratio which provides a further means of verification of the validity of the banknote 2. Non-uniform velocity swipes could be taken account of by sensing the velocity at which the banknote is swiped and compensating appropriately, although this would inevitably increase the complexity and cost of the validator 40.

A further mode of validation could be provided by using a relatively constant velocity swipe and detecting the leading edge and trailing edge of the banknote 2. The frequency of the detected window portions could then be compared with a predetermined range of frequencies attributed to genuine banknotes.

Other embodiments of the invention might include the utilisation of a linear CCD array and an associated illuminating source, which may be moved across the banknote in any direction and the signals appropriately processed to provide validation signals. To reduce processing requirements, the CCD array could be swiped in a direction either parallel with the security strip 4 or the perpendicular to the security strip 4. When the CCD array is swiped in a direction perpendicular to he security thread 4, or the CCD array is located directly above the windows 6, an array of outputs having a profile as illustrated in FIG. 9 could be simultaneously generated. If the CCD array were swiped in a direction parallel to security thread 4, at least one of the CCD sensors would generate a time-varying output as illustrated in FIG. 9.

It will be appreciated that any or all of the methods of validation described in relation to the illustrated embodiments may be used singly or in combination. The validator may not need to be intermittently actuable, but may have a simple on/off switch. Furthermore, there are doubtless many other ways of detecting the thread exposure windows 6 in a banknote, or other security document. In fact, in the case of banknotes which have increased thickness and/or density in the region of the rungs 8, it may not be necessary to detect radiation transmitted through windows at all, since validation could be achieved by sensing only the transmissivity of the rung portions and that of the remainder of the banknote. As previously mentioned, mechanical sensing of thickness variations in the area of the window portions of a banknote might also be employed.

Various other modifications or variations could be employed without departing from the scope or spirit of the invention.

Herein, it will be appreciated, at least in relation to the preferred embodiments, the term "window" includes apertures in the security document, and regions of reduced density or thickness in the document. The term "exposed" meanwhile includes the possibility that a transparent or relatively thin layer is present over the security device in the area of a window.

The invention is applicable not only to hand-held banknote validators, but also other human operated devices such as stationarily-mounted swipe-through validators, and automatic banknote validators.

What is claimed is:

1. A method of validating a security document comprising an embedded security device which is at least partially exposed by one or more exposure windows, the method comprising:

- inspecting the document in one or more regions adjacent said security device;
- sensing radiation transmitted through a first region of the document to produce a first output and sensing radiation transmitted through a second region of the document to produce a second output;
- analyzing the outputs to judge on the presence of said one or more exposure windows; and
- judging on the presence of said one or more exposure windows on the basis of said inspecting to provide a validation signal;
- wherein said validation signal is provided when said first output indicates that the sensed radiation has passed through an exposure window and said second output indicates that the sensed radiation has not passed through an exposure window.

2. A method according to claim 1, wherein said security document has characteristics which are present over an extended area in which all said exposure windows are included, said validation signal being provided on the basis of the detection of said characteristics in a part only of said extended area.

3. A method according to claim 1, wherein said inspecting step comprises generating radiation and locating the document such that said radiation impinges on the document.

4. A method according to claim 1, wherein said sensed radiation comprises infra-red radiation.

5. A method according to claim 1, wherein said analysis involves comparing at least one of said outputs with a predetermined reference value or a predetermined range of values during said analysis.

6. A method according to claim 1, wherein said security device is a strip or thread, and said first and second regions through which the sensed radiation passes are spaced in a direction parallel to said security device.

7. A method according to claim 6, wherein said inspecting step comprises moving a sensor relative to said document in a direction generally parallel to said security device, and said first and second outputs are produced sequentially during the movement.

8. A method according to claim 1, wherein said inspecting step comprises inspecting the document simultaneously in at least two regions, said judging step comprising judging on the presence of said one or more exposure windows in any of said at least two regions.

9. A method of validating a security document comprising an embedded security device which is at least partially exposed by one or more exposure windows, the method comprising:

- inspecting the document in one or more regions adjacent said security device;
- sensing radiation transmitted through a first region of the document to produce a first output and sensing radiation transmitted through a second region of the document to produce a second output;
- analyzing the outputs to judge on the presence of said one or more exposure windows, wherein said analysis involves taking a difference between said outputs; and
- judging on the presence of said one or more exposure windows on the basis of said inspecting to provide a validation signal.

10. A method of validating a security document comprising an embedded security device which is at least partially exposed by one or more exposure windows, the method comprising:

- inspecting the document in one or more regions adjacent said security device;
- sensing radiation transmitted through a first region of the document to produce a first output and sensing radiation transmitted through a second region of the document to produce a second output;
- analyzing the outputs to judge on the presence of said one or more exposure windows, wherein said analysis involves taking a ratio of said outputs; and
- judging on the presence of said one or more exposure windows on the basis of said inspecting to provide a validation signal.

11. A method according to claim 10, wherein said inspecting step comprises inspecting said document along a line to produce a profile of the document along said line, said validation signal being provided in response to, or in the absence of, the detection of a desired variation in said profile indicating the presence of said one or more exposure windows.

12. A method according to claim 11, wherein said profile is a profile of the transmission characteristics of said document along said line of inspection.

13. A method according to claim 11, wherein said detection involves detecting one or more windowed regions, and detecting one or more non-windowed regions.

14. A method according to claim 13, wherein said profile is analysed to perform said judging, said analysis involving determining the geometric relationship of said detected windowed regions with said detected non-windowed regions along said line of inspection.

15. A method according to claim 14, wherein said analysis involves taking a ratio of the length of one or more or the detected windowed regions along said line with the length of one or more of the detected non-windowed regions along said line.

16. A method of validating a security document comprising an embedded security device which is at least partially exposed by one or more exposure windows, the security device comprising a strip or thread, the method comprising:

inspecting the document in one or more regions adjacent said security device;

sensing radiation transmitted through a first region of the document to produce a first output and sensing radiation transmitted through a second region of the document to produce a second output, said first and second regions through which the sensed radiation passes being spaced in a direction parallel to said security device, wherein said first output is produced by a first sensor and said second output is produced by a second sensor;

analyzing the outputs to judge on the presence of said one or more exposure windows; and judging on the presence of said one or more exposure windows on the basis of said inspecting to provide a validation signal.

17. A method of validating a security document comprising an embedded security device which is at least partially exposed by one or more exposure windows, the method comprising:

inspecting the document simultaneously in at least two regions adjacent said security device, wherein said at least two regions are spaced in a direction transverse to said security device;

sensing radiation transmitted through a first region of the document to produce a first output and sensing radiation transmitted through a second region of the document to produce a second output;

analyzing the outputs to judge on the presence of said one or more exposure windows; and judging on the presence of said one or more exposure windows in any of said at least two regions on the basis of said inspecting to provide a validation signal.

18. Apparatus for validating a security document comprising an embedded security device which is at least partially exposed by one or more exposure windows, the apparatus comprising:

means for inspecting the document in one or more regions, said inspecting means comprising one or more radiation emitting means and one or more radiation detecting means, at least one of said emitting means being located on a first support means and at least one of said detecting means being opposedly located on a second support means, said first and second support means being separated by an opening into which a document is to be inserted by a human operator for inspection using the apparatus; and means for judging on the presence of said one or more exposure windows, in response to an output of said inspecting means generated when inspecting said document in one or more regions adjacent said security device, to provide a validation signal.

19. Apparatus according to claim 18, said inspecting means being arranged to inspect only a portion of the document, the apparatus further comprising means for indicating to a human operator a desired disposition of said security device during inspection.

20. A validator for security documents, said validator comprising sensor means for discriminating between valid and counterfeit security documents, switch means for activating said sensor means, and support means for said sensor means, wherein said support means comprises a first portion and a second portion separated in a first relative position by an opening for a document to be validated, said first portion being movable with respect to said second portion to a second relative position whereby said switch means is actuated.

21. A validator according to claim 20, wherein said sensor means comprises radiation emitting means located on said first portion of the support means, and radiation sensing means located on said second portion of the support means.

22. A validator according to claim 21, wherein said radiation sensing means comprises an infra-red radiation sensor.

23. A validator according to claim 20, comprising a plurality of radiation sensors providing a plurality of outputs to a processing means for analysing said plurality of outputs to provide a validation signal.

24. A validator according to claim 23, wherein said processing means analyses two or more of said outputs in combination to determine whether said validation signal should be given.

25. A validator according to claim 20, adapted so that when said support means is in said second relative position, a said sensor means may be moved relative to a document to be validated located between said first and second portions of the support means.

26. A validator according to claim 25, wherein, in said second relative position, said first and second portions remain separated by an opening allowing a document to be validated to be moved relative to said sensor means.

27. A validator according to claim 20 comprising means for detecting a security device in a security document which is at least partially exposed by one or more exposure windows.

* * * * *

UNITED STATES PATENT AND TRADEMARK OFFICE

CERTIFICATE OF CORRECTION

PATENT NO. : 6,438,262 B1 
DATED : August 20, 2002
INVENTOR(S) : Ronald Bernardini, John Gorczyca and Phil Skipper It is certified that error appears in the above-identified patent and that said Letters Patent is hereby corrected as shown below:

Title page,
Item [57], ABSTRACT,
Line 3, change "exposes" to -- exposed --.
Line 5, change "that" to -- than --.
Line 10, change "contefeit" to -- counterfeit --.

Column 1,
Line 12, change "accent" to -- accept --.
Line 33, change "recognizion" to -- recognition --.

Column 2,
Line 13, change "or" to -- of --.

Column 3,
Line 3, change "outouts" to -- outputs --.
Line 6, insert period after "windows".
Line 29, change "or" to -- of --.
Line 45, change "i" to -- if --.

Column 4,
Line 24, change "or" to -- of --.

Column 5,
Line 6, remove comma after "transmitted".
Line 11, change "nm" to -- mm --.
Line 60, change "apear" to -- apart --.

Column 6,
Line 7, change "chotodiodes" to -- photodiodes --.
Line 18, change "a" to -- 8 --.
Line 19, change "pihotodiodes" to -- photodiodes --.
Line 57, change "lit" to -- light --.
Line 65, change "he" to -- the --.

UNITED STATES PATENT AND TRADEMARK OFFICE

CERTIFICATE OF CORRECTION

PATENT NO. : 6,438,262 B1 
DATED : August 20, 2002
INVENTOR(S) : Ronald Bernardini, John Gorczyca and Phil Skipper It is certified that error appears in the above-identified patent and that said Letters Patent is hereby corrected as shown below:

<u>Column 7,</u>
Line 20, change “3” to -- 8 --.
Line 29, insert period after “numerals”.
Line 35, change “that” to -- than --.
Line 38, change “40” to -- 46 --.
Line 45, change “or” to -- of --.
Line 58, change “rasses” to -- passes --.
Line 67, change “corion” to -- portion --.

<u>Column 8,</u>
Line 12, insert -- if -- after “that”.
Line 22, change “or” to -- of --.
Line 30, change “utiilised” to -- utilised --.
Line 57, delete “the” before “perpendicular”.
Line 59, change “he” to -- the --.

<u>Column 10,</u>
Line 62, change “or” to -- of --.

Signed and Sealed this

Eleventh Day of March, 2003

JAMES E. ROGAN
*Director of the United States Patent and Trademark Office*